United States Patent
Nangle et al.

(10) Patent No.: US 9,346,115 B2
(45) Date of Patent: *May 24, 2016

(54) SEMI-AUTOMATIC BRAZING DEVICE

(71) Applicant: LINCOLN GLOBAL, INC., City of Industry, CA (US)

(72) Inventors: David J. Nangle, Loveland, OH (US); Andreu P. Meckler, Mentor, OH (US); Robert M. Henson, Loveland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,248

(22) Filed: May 4, 2015

(65) Prior Publication Data

US 2015/0231722 A1 Aug. 20, 2015

Related U.S. Application Data

(63) Continuation of application No. 14/325,771, filed on Jul. 8, 2014, now Pat. No. 9,050,675, which is a continuation of application No. 12/256,041, filed on Oct. 22, 2008, now Pat. No. 8,803,033.

(51) Int. Cl.
*B23K 10/00* (2006.01)
*B23K 3/08* (2006.01)
*B23K 3/06* (2006.01)

(52) U.S. Cl.
CPC .. *B23K 3/08* (2013.01); *B23K 3/063* (2013.01)

(58) Field of Classification Search
CPC ............ B23K 3/063; B23K 9/12; B23K 9/22; H05H 1/36; H05H 1/38; H05H 1/42
USPC .................... 219/137.7, 137.31, 137.63, 144, 219/121.39, 121.45, 121.54, 76.15, 76.16, 219/132, 137.61
See application file for complete search history.

(56) References Cited

U.S. PATENT DOCUMENTS

| 3,629,547 A | 12/1971 | Kester et al. |
| 3,689,733 A | 9/1972 | Matasovic et al. |
| 4,508,954 A | 4/1985 | Kroll |
| 4,510,373 A | 4/1985 | Cox et al. |
| 4,608,482 A | 8/1986 | Cox et al. |
| 4,703,156 A | 10/1987 | Hayes |
| 5,384,447 A | 1/1995 | Raloff et al. |

(Continued)

FOREIGN PATENT DOCUMENTS

| CN | 1919516 | 2/2007 |
| EP | 2036647 | 3/2009 |

(Continued)

OTHER PUBLICATIONS

"Power Brazer" product brochure;www.harrisproductsgroup.com.

(Continued)

*Primary Examiner* — Mark Paschall
(74) *Attorney, Agent, or Firm* — Perkins Coie LLP

(57) ABSTRACT

A semi-automatic brazing apparatus having a brazing wire feeding apparatus containing a brazing wire feed mechanism, a controller, and a user input device. The brazing wire from a brazing wire source is continuously drawn from the source through the apparatus via the feeding mechanism and is directed towards a brazing gun for a semi-automatic brazing operation.

20 Claims, 3 Drawing Sheets

(56) References Cited

U.S. PATENT DOCUMENTS

| | | |
|---|---|---|
| 5,512,726 A | 4/1996 | Arantes et al. |
| 5,595,671 A | 1/1997 | David |
| 5,932,123 A | 8/1999 | Marhofer et al. |
| 6,051,808 A | 4/2000 | Kleppen et al. |
| 6,166,350 A | 12/2000 | Sickels |
| 6,225,599 B1 | 5/2001 | Altekruse |
| 6,285,003 B1 | 9/2001 | Kleppen et al. |
| 6,315,186 B1 | 11/2001 | Friedl et al. |
| 6,498,321 B1 | 12/2002 | Fulmer et al. |
| 6,707,002 B2 | 3/2004 | Rice et al. |
| 6,758,423 B1 | 7/2004 | Perkins et al. |
| 6,815,641 B2 | 11/2004 | Doherty |
| 6,841,752 B2 | 1/2005 | Ward |
| 6,855,914 B1 | 2/2005 | Kaufman et al. |
| 2003/0093503 A1 | 5/2003 | Yamaki et al. |
| 2004/0050832 A1 | 3/2004 | Mortendorfer et al. |
| 2004/0173583 A1 | 9/2004 | Iriyama et al. |
| 2004/0245230 A1 | 12/2004 | Huismann et al. |
| 2005/0023263 A1 | 2/2005 | Blide |
| 2005/0103768 A1 | 5/2005 | Ward |
| 2005/0199605 A1 | 9/2005 | Furman et al. |
| 2006/0196862 A1 | 9/2006 | Sickels |
| 2007/0051711 A1 | 3/2007 | Kachline |

FOREIGN PATENT DOCUMENTS

| | | |
|---|---|---|
| EP | 2138260 | 12/2009 |
| JP | 9-206933 | 8/1997 |
| WO | WO 0044523 A1 | 8/2000 |

OTHER PUBLICATIONS

Chinese Patent Application No. 200980141746.1, Office Action, 5 pages, Jun. 5, 2014.

International Patent Application No. PCT/IB2009/007196, International Search Report & Written Opinion, 10 pages, Feb. 25, 2010.

SEMI-AUTOMATIC BRAZING DEVICE

PRIORITY DATA AND INCORPORATION BY REFERENCE

This application is a continuation of prior U.S. application Ser. No. 14/325,771 filed Jul. 8, 2014, now U.S. Pat. No. 9,050,675, which is a continuation of U.S. application Ser. No. 12/256,041, filed Oct. 22, 2008, now U.S. Pat. No. 8,803,033, all of which are incorporated herein by reference in their entirety.

BACKGROUND OF THE INVENTION

1. Field of the Invention

Devices, systems, and methods consistent with the invention relate to a method and apparatus for semi-automatic brazing.

2. Description of the Related Art

As is well known, brazing is a joining process which employs a filler metal or alloy to join two or more pieces or components together. Most often the parts to be joined are metallic. During the brazing process the filler metal is melted via high heat and then distributed between close-fitting parts (such as piping). This distribution occurs via capillary action, where the filler metal is drawn into the gaps between the parts to be brazed. Upon cooling the filler metal forms a bond between the joined pieces.

Current manual brazing processes involve using brazing rods, which are straight, fairly rigid, and can range in length from about 1 to 3 feet. In manual brazing (namely brazing done by hand) the brazing rod is placed in contact with the materials to be joined and the worker must continuously move the brazing rod around while at the same time pushing the brazing rod towards the pieces to be joined. This is often difficult to do in situations or environments where space is limited. The length of the brazing rods can be difficult to deal with in small or difficult work environments. Thus, operators would tend to break the rods into smaller lengths. When this is done the rod is consumed quicker, thus requiring starting and stopping often by the operator performing the brazing.

An additional problem associated with current manual brazing techniques is the inherent inefficiencies in using the brazing rods. Specifically, if a brazing operation requires more than a single brazing rod, the operator must stop brazing to join a new replacement rod to a brazing rod already being used. This aids in ensuring that a continuous brazing process is completed. Alternatively, the operator could braze with a single rod until the remainder of it is discarded and then begin brazing with a second rod. Again, this process is inefficient and results in delay and inefficiencies.

An additional problem associated with current manual brazing techniques is the resultant waste. Because very high heat is used in the brazing process (very often generated by a large flame) an operator can not hold and use the entire length of a brazing rod. Because of this, approximately 10% of the length of each brazing rod is thrown away, or otherwise wasted. This is primarily because the operator is unable to use the portion of the brazing rod that they are holding in their hand. Additionally, if the entire usable length of a brazing rod is not used for an operation it is often discarded, again resulting in significant waste.

Accordingly, it is desirable to address the above issues, while at the same time not affecting or otherwise compromising the brazing process.

BRIEF SUMMARY OF THE INVENTION

A brazing apparatus in accordance with an embodiment of the present invention contains a brazing wire feeding apparatus, a supply of brazing wire wherein the brazing wire is fed through the brazing wire feeding apparatus, and a brazing wire gun through which the brazing wire passes.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
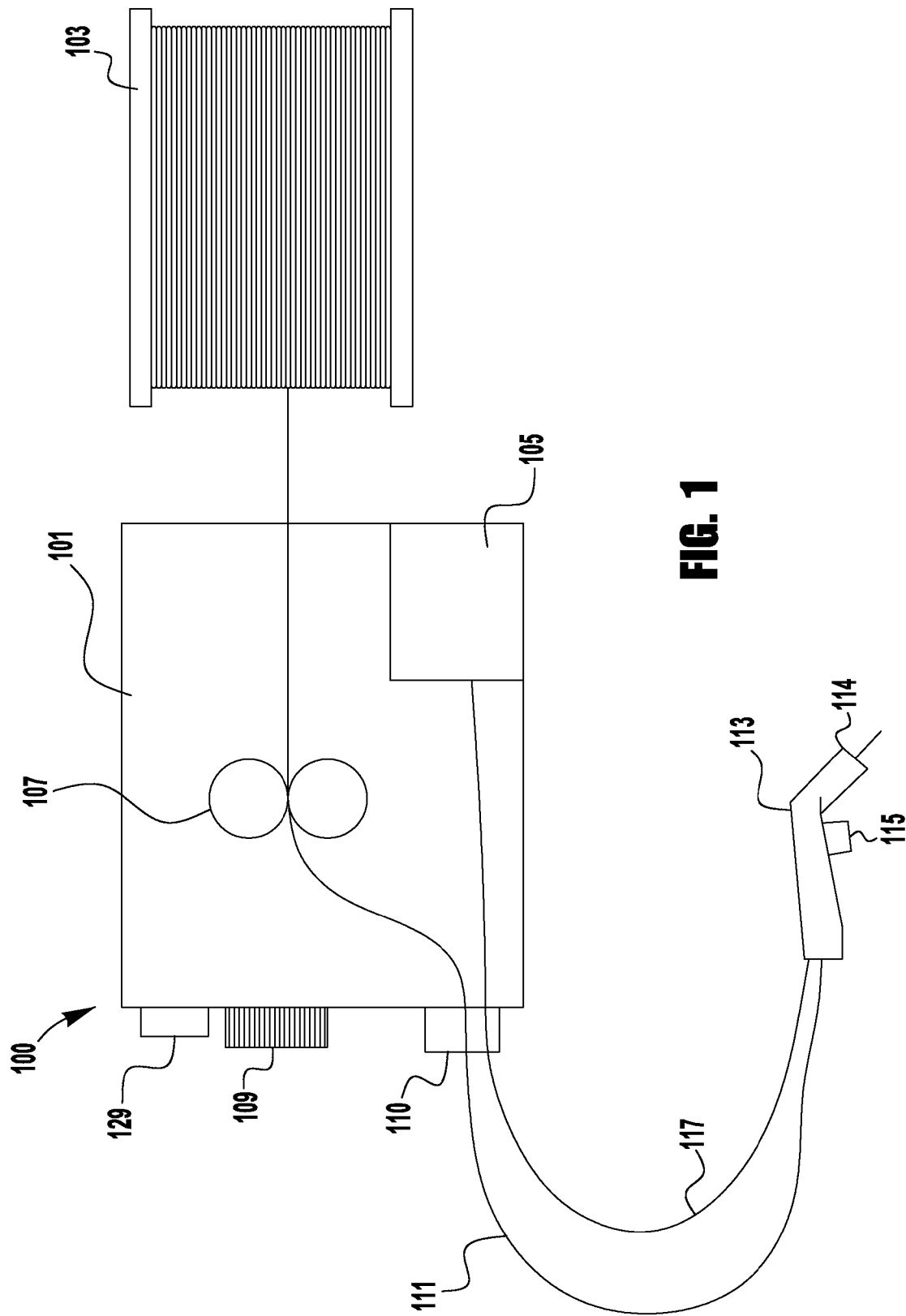
FIG. 1 illustrates a diagrammatical representation of an exemplary embodiment of an embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 depicts a diagrammatical representation of an exemplary embodiment of the present invention. As shown, a semi-automatic brazing apparatus 100 comprises a brazing wire feeding apparatus 101 containing a brazing wire feed mechanism 107 (for example rollers or drive wheels), a controller 105, and a user input device 109. Brazing wire 111 from a brazing wire source 103 is continuously drawn from the source 103 through the apparatus 101 via the mechanism 107 and exits the apparatus 101 at an exit portion 110. After the brazing wire 111 exits the exit portion 110 it passes through a conduit (item 119 shown in FIG. 2) and passes through a brazing gun 113, where the wire 111 exits the nozzle portion 114 of the gun 113.

During operation, which will be further described below, an operator holds the brazing gun 113 and is able to conduct a semi-automatic brazing operation in a continuous fashion, without the need to constantly stop and change or connect brazing rods.

Within the brazing wire source 103, the brazing wire 111 is coiled or rolled or otherwise provided in a single continuous length. Of course, it is recognized that the source 103 does not provide an infinite length of brazing wire 111, in that it must be replaced from time to time. However, the length of brazing wire 111 within the source 103 can be considerably longer than brazing rods. Accordingly, the overall efficiency of the present invention over the prior art is dramatic. For example, when employing embodiments of the present invention the amount of wasted material is significantly reduced. By employing the present invention the vast majority of the wire 111 from the source 103 is consumed as needed and the only material that remains unused is potentially the material remaining between the brazing wire feed mechanism 107 and the gun 113 when the source 103 is depleted. Accordingly, the present invention results in almost 100% consumption of the brazing wire, whereas the use of brazing rods would only result in approximately 90% consumption. Moreover, the time savings of the present invention significantly increases the operational efficiency of the brazing operation.

As shown, the brazing wire 111 passes from the exit portion 110 to the brazing gun 113 and exits the brazing gun 113 at the brazing gun nozzle 114, and via the operator's handling of the gun 113 the wire 111 is directed as needed for the brazing operation. In an embodiment of the invention, the brazing gun 113 comprises a trigger device 115. The trigger device 115 is engaged, during operation, by the operator to start and/or control the feeding of the brazing wire 111. The trigger 115 is coupled to a controller 105 within the brazing wire feed apparatus 101. The coupling can be via a wire 117 (as shown), or can alternatively be remotely, such as via wireless communication methods.

Therefore, as the trigger 115 is depressed by an operator the controller 105 signals a motor or drive mechanism (not shown) which drives the brazing wire feeding mechanism 107 and causes the mechanism 107 to feed the wire 111 toward and through the gun 113.

The controller 105 can be any known or conventional uses computer control device, such as a CPU or the like. The present invention is not limited in this regard.

In an embodiment of the invention, the brazing wire feeding apparatus 101 contains a user input device 109. The user input device 109 can be placed at any convenient location on the apparatus 101, such as the face of the apparatus 101 (as shown) or on the top, as is desired. The user input device 109 can be used to allow the operator to input various operational parameters of the brazing wire 111 or the brazing operation. Non-limiting examples of input parameters include: (1) brazing wire diameter, (2) brazing wire material, (3) desired brazing wire feed speed, and/or (4) whether or not trigger pressure sensitivity (described below) is engaged or not. Of course, it is contemplated that additional user input parameters can be input through the user input device and the present invention is not limited in this regard.

In an embodiment, the user input device 109 is coupled to the controller 105 and/or the feed mechanism 107 and/or the drive motor or mechanism (not shown) to effect the desired input parameters. In an exemplary embodiment, the input device 109 is coupled only to the controller 105 and the controller 105 ensures that the apparatus 101 performs as requested. For example, by inputting the brazing wire diameter the controller controls the spacing or gap in the feeding mechanism 107 (e.g., space between rollers). By inputting the brazing wire type/material the controller 105 may adjust the gap, as discussed above, and/or adjust the pressure applied by the feeding mechanism 107—based on the hardness of the brazing wire. By inputting the desired feed speed the controller 105 controls the motor/drive mechanism (not shown) which ensures that the feeding mechanism 107 operates at the desired speed when the trigger 115 is depressed by the operator. Of course, any other control and operational functions can be input and/or controlled from the user input device 109.

Figure 2:
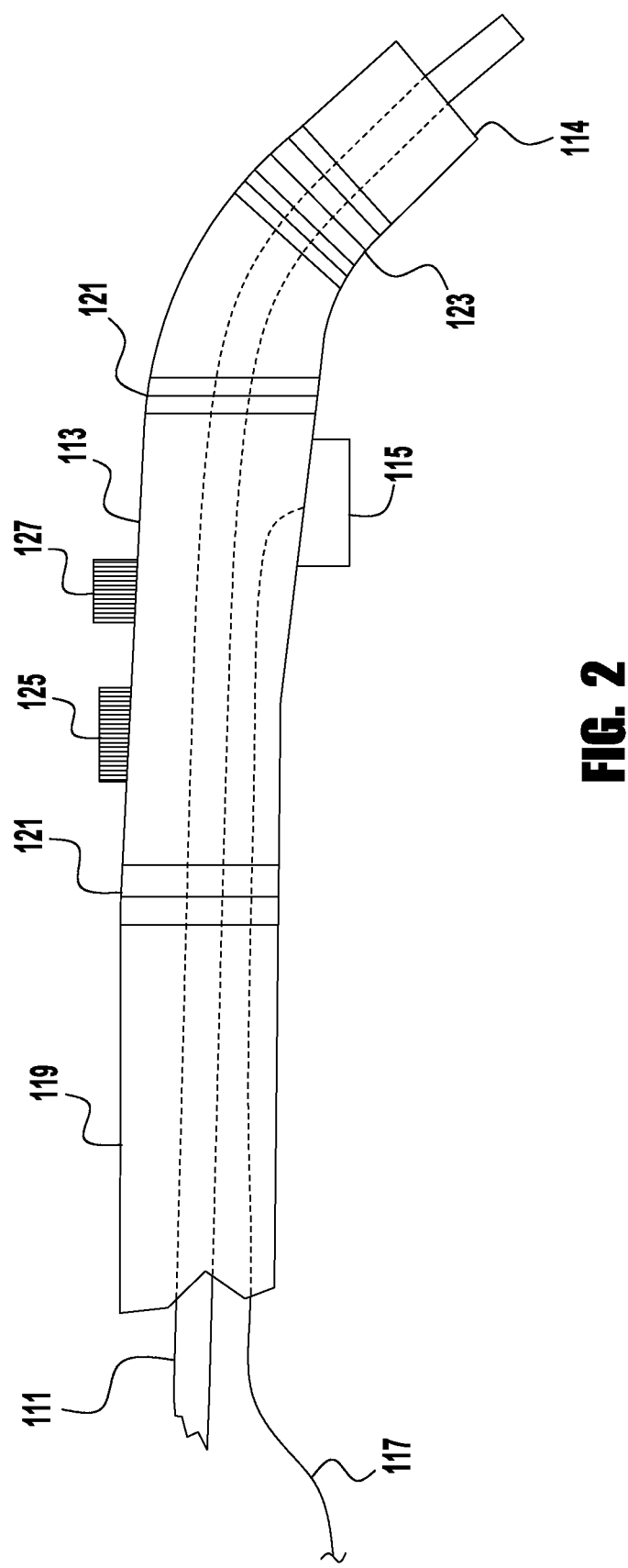
FIG. 2 illustrates a diagrammatical representation of a brazing gun in accordance with an embodiment of the present invention.

Turning now to FIG. 2, an embodiment of the brazing gun 113 is depicted. Coupled to the gun 113 is a conduit portion 119 through which the brazing wire 111 and the wire 117 (if present). The conduit portion 119 provides protection for the brazing wire 111 and wire 117 as well as directing the brazing wire 111 to the gun 113. The conduit portion 119 can be of any flexible material construction, but should be durable because of the typical environments and applications in which brazing occurs.

In an embodiment, the conduit portion 119 is coupled to the gun 113 via a positionable connector portion 121. The positionable connector portion 121 is of a construction to allow the gun 113 to be positionable with respect to conduit portion 119. This increases the operational flexibility of the overall brazing operation. In a further embodiment, the positionable connector portion 121 is rotatable up to 360 degrees which allows the operator to optimize the positioning and orientation of the gun 113 during brazing (for example to reach both above and below pipes with minimal repositioning). In this embodiment, the connector portion 121 is a rotational coupling which allows the gun 113 to fully rotating without causing the brazing wire 111 or wire 117 to twist or bind. Such coupling structures are known and will not be described in detail herein.

In a further exemplary embodiment, an additional positionable connector portion 121 is located downstream (closer to the gun nozzle 114) of the trigger 115. In this embodiment, the operator can reposition the nozzle end of the gun 113 without changing the orientation of the trigger 115. This adds additional operational flexibility for the operator. Of course, it is also contemplated that embodiments of the present invention may have no positionable connector connecting the conduit 119 and gun 113, or at both locations as shown in FIG. 2, or only upstream of the trigger 115, or at other feasible locations.

As shown in FIG. 2, an embodiment of the present invention may also contain a flexible portion 123 in the gun 113 near the nozzle 114. The flexible portion 123 may be of any known or conventional construction to allow for the nozzle 114 to be flexibly or movably connected to the remainder of the gun 113. For example, if the gun 113 were made of metal the flexible portion 123 can be made of rubber materials, or the like. Optionally, the flexible portion 123 can be made of metallic materials which allow for the additional positioning of the nozzle 114 with respect to the remainder of the gun 113. This added flexibility provides for additional positioning by the operator and can provide for easier access in difficult working environments. In various embodiments of the present invention, the flexible portion 123 can be elastic in that the nozzle portion 114 always returns to its default position once any side pressure to the nozzle 114 is removed or inelastic in that the nozzle 114 will remain in its position until repositioned by the operator.

The trigger 115 can be of any known configuration, such as a button, dial, or "trigger", or the like. FIG. 2 depicts the trigger as a button which is depressed during operation by the operator. As the trigger 115 is depressed, rotated, moved or otherwise operated a signal is sent along the wire 117 to the controller 105 which activates the brazing wire feed mechanism 107 and advances the brazing wire 111 at the desired or preset speed. In an embodiment of the invention, the trigger 115 represents a simple on/off switch in which in the on position the wire 111 is fed at the speed set using the user input 109 and in the off position no wire 111 is being advanced. However, other embodiments are contemplated. For example, in an alternative embodiment the trigger 115 is a multi-position switch having more than simply on/off positions. In this embodiment, the trigger 115 can act as a displacement sensitive potentiometer. In such an embodiment, as the displacement of the trigger 115 is increased (via more pressure from the operator) the signal sent to the controller changes causing the speed of the advancement of the brazing wire 111 to be increased. Therefore, the operator can change the speed of the wire 111 depending on how much the trigger is displaced. It is contemplated that the increase in wire speed can have either a linear or non-linear relationship to the speed of the wire 111. For example, in a non-linear relationship, the further the trigger 115 is depressed (or moved) the rate at which the wire 111 is fed exponentially increases.

In an exemplary embodiment, once pressure is removed from the trigger 115 it returns to an off position. However, in an alternative embodiment, the trigger 115 can be of the "push button" type in which once the trigger is engaged the operator can remove the pressure on the trigger 115 and the feeding operation will continue, and then when the operator wishes to shut off the wire feeding the operator simply engages the trigger 115 a second time.

It should be noted that the location of the trigger 115 on the gun 113 can vary on different embodiments. For example, in FIG. 2 the trigger 115 is positioned such that it could be operated by the index finger. However, it is also contemplated that the trigger 115 can be positioned at any ergonomic location on the gun 113. For example, the trigger 115 can be located on the top of the gun 113 so that an operator's thumb can engage the trigger 115.

In a further embodiment of the invention (and as shown in FIG. 2), a wire speed control 125 can be located on the gun 113. In this embodiment, the operator can control the advancement speed of the brazing wire 111 via a control 125 on the gun 113. In this embodiment, the operator will not have to constantly go to the user input 109 on the apparatus to control the wire speed. In such an embodiment, the control 125 is coupled to the controller 105 through the wire 117, through a different wire (not shown), wirelessly, or by any other conventional means. Of course, in further embodiments of the invention, the control 125 is not present.

In a further exemplary embodiment, the trigger 115 can be of the type which controls both wire feed speed and wire feeding. For example, to engage the wire feeding operation the trigger 115 can be depressed, while the wire feed speed can be adjusted by rotating the trigger 115, such as a knob. Such control switch types are known. Thus, a user can employ only a single finger to adjust the speed and activate the wire feeding operation.

In a further embodiment, the wire feed speed can be controlled by a "thumb-wheel" type control (not shown) which is positioned at a suitable location to allow control of the wire feed speed via a user's thumb during operation.

As is evident above, various known methodologies can be used to enhance the benefits of the present invention, without diverging from the scope and spirit of the present invention.

In a further exemplary embodiment of the present invention, the wire feeding apparatus 101 contains an additional user input device 129 which is employed by an operator to "set" various operational parameters which are intended to be repeated automatically. The user input device 129 can be made up of any known or used input devices and include an LCD display or the like to display various system/operational information. The use of the input device 129 is explained more fully below.

During many types of brazing operations there can be a fair amount of repetition in the brazing process. For example, very often identical joints are repeatedly brazed using essentially the same amount of brazing wire, in the same amount of time and at the same wire feed speed. Therefore, to further increase efficiency and accuracy in a brazing process, the input device 129 allows a user to input and store (within the controller 105 or similar or duplicate controller) various operational parameters which are to be repeated. As an example, a joint may require a length of 4 inches of brazing wire to complete the operation. An operator can preset the controller 105, via the input 129 to feed only 4 inches of wire every time the trigger 115 is depressed. Therefore, the operator need only press the trigger 115 once and the controller 105 will ensure that the proper amount of brazing wire 111 is delivered.

Figure 3:
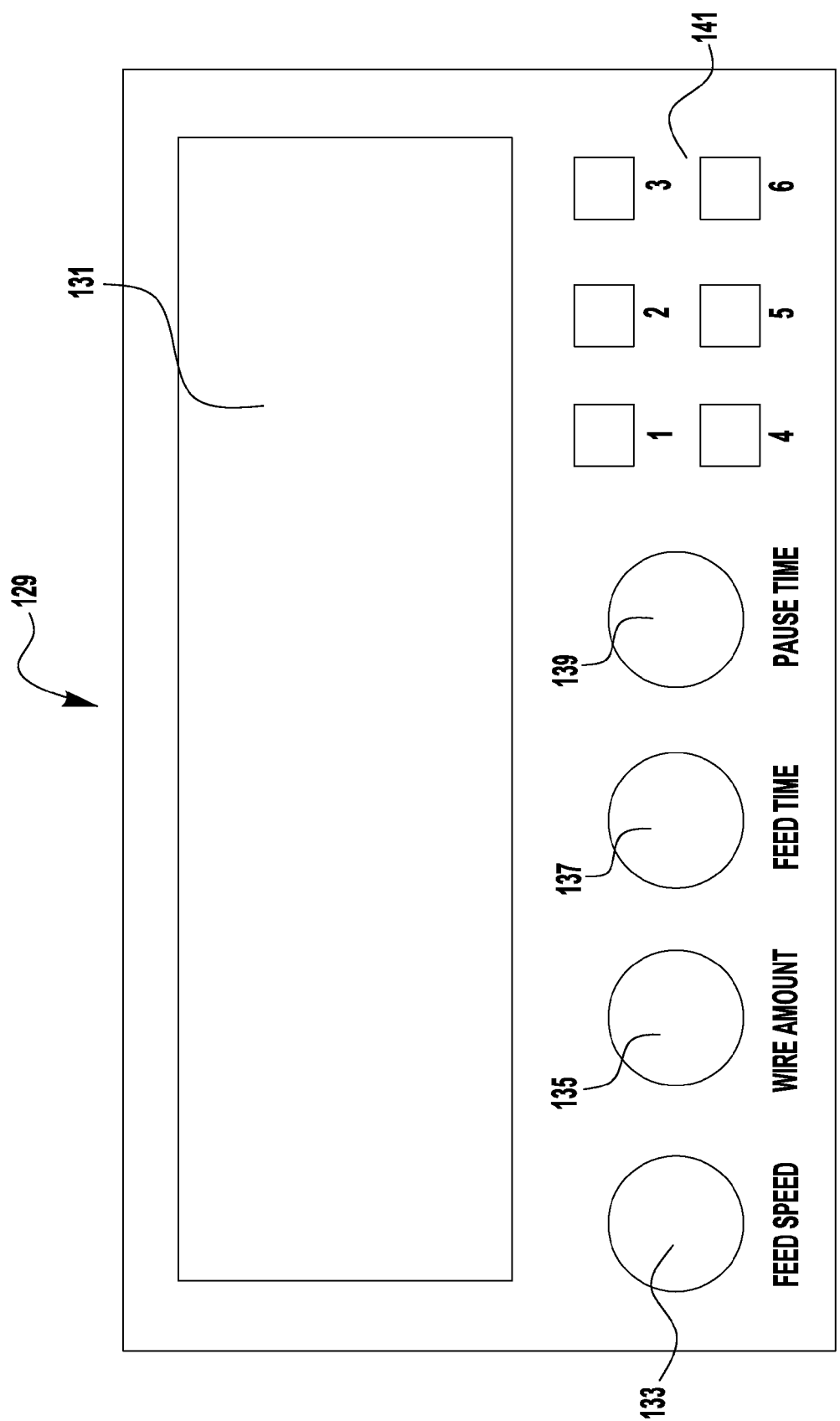
FIG. 3 illustrates a diagrammatical representation of a user input panel in accordance with an embodiment of the present invention.

An exemplary embodiment of a user input 129 is shown in FIG. 3. It is noted that this depiction is intended to be merely exemplary and not limit the scope or spirit of the present invention in any way.

As shown in this embodiment, the user input 129 contains a display panel 131 which can be of any known type, such as an LCD type. The display panel 131 can be used to display any operational data regarding the apparatus 100, including wire feed speed, wire diameter, remaining wire on the spool 103, or any other parameters desired.

The input 129 further contains input controls 133, 135, 137 and 139, which can be used to preprogram or input wire feed speed, wire amount, wire feed time, pause time, or any other operational parameter desired. Using these controls, a user can preprogram, for a brazing operation, the feed speed desired, the amount of wire (for example, length), the feed time and/or the duration of a pause between various feeding operations. As this data is entered it can be displayed on the display 131 to aid in the data entry. Thus, once the settings are programmed a user need only depress the trigger 115 once (or hold it—depending on the desired method of operation) to begin the preprogrammed operation. In an embodiment using a pause setting or duration, the controller 105 will wait the desired or set pause time and then begin the programmed process again. This is beneficial in an assembly line type situation, where the delay between brazing operations is generally known.

In a further embodiment, the unit 129 contains memory buttons 141. The memory buttons 141 allow a user to preprogram the parameters of a brazing operation and then "store" the programmed information to a set memory space. (It is noted that the data regarding preprogrammed and/or programmed settings can be stored in the controller 105, or similar CPU type device). Thus, each memory button 141 is associated with a set of operational parameters and an operator need only press a button 141 to select a specific set of parameters. In an embodiment, all or some of the parameters associated with the selected preprogrammed information is displayed on the display 131 to allow the user to confirm it is the correct information. Further, in an embodiment, the unit 129 is equipped with means to allow an operator to "name" each of the stored settings so that an operator can easily recognize that they have selected the proper selection.

Implementing various embodiments of the unit 129, its input and display devices and its control/operation are well within the capabilities of those of ordinary skill in the art.

In yet a further exemplary embodiment, the gun 113 contains at least some or all of the controls discussed above on the unit 129. This allows an operator to control or set various parameters from the gun 113 rather than having to go back to the apparatus 101. As shown in FIG. 2, for example, the gun 113 contains a memory switch 127 which allows the operator to "store" various parameters of a brazing operation.

For example, prior to conducting a brazing operation, the operator depresses the button 127. This signals to the controller 105 (as an example) to be ready to record the relevant parameters of a following brazing operation, such as feed speed, wire amount, and/or duration of wire feeding. Then, the operator conducts the brazing operation as desired and once the operation is completed the operator again depresses the button 127. This "sets" the recorded data so that when the operator depresses the trigger 113 the stored operation is repeated.

In another alternative embodiment, the button 127 can be used to store multiple preprogrammed operations. For example, the button can be depressed twice in succession to create a second preprogrammed operation, which is different from the first stored operation.

In a further embodiment, the button 127 can also have a rotary operation which allows a user to set the button to a first position to record parameters for a first memory space and a second position to record parameters for a second operation having at least one different parameter. Thus, an operator can set different preprogrammed operations from the gun 113. Of course, the present invention is not limited to two settings from the gun 113, but any number of settings can be implemented.

Further, the present invention is not limited to employing a single button 127 for the preprogramming operations, as any configuration can be employed to enable this feature of the present invention.

As can be seen the overall versatility and efficiency of brazing is greatly enhanced by the features and embodiments of the present invention.

The various embodiments discussed above allow an operator to perform semi-automatic brazing for the first time. As discussed previously, manual brazing involved the use of brazing rods which are inconvenient and inefficient. Additionally, their use resulted in significant waste. The present invention has solved all of these problems with prior manual brazing methods by permitting an operator to have a means to braze in a semi-automatic fashion. The present invention greatly improves efficiency, reduces cost and reduces waste over prior manual techniques. Further, embodiments of the present invention allow an operator to easily braze in difficult environs, whereas prior manual brazing was inefficient and difficult in such locations.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A wire deposition apparatus comprising:
    a wire gun having a channel to pass a wire to be deposited, the gun having a trigger portion and a memory switch, the trigger portion includes a displacement sensitive potentiometer to provide trigger pressure sensitivity; and
    a control device operably connected to the wire gun, the control device to control feeding of the wire through the wire gun based upon input from a user on a user input device connected to the control device, the control device further having at least one memory space, the memory switch being configured with the at least one memory space for recording at least one operational parameter to the memory space, the at least one operational parameter including said trigger pressure sensitivity.

2. The apparatus of claim 1, further comprising:
    a wire feeding apparatus,
    wherein the wire is fed through the wire feeding apparatus.

3. The apparatus of claim 2,
    wherein the user input device is positioned on at least one of the wire feeding apparatus and the wire gun to accept the input from the user.

4. The apparatus of claim 1, wherein the at least one operational parameter can be input by the user input device, the at least one operational parameter includes at least one of a diameter of the wire, a material of the wire, a wire feed speed for the wire, and a duration of a wire feeding operation.

5. The apparatus of claim 1, wherein the trigger portion activates the feeding of the wire.

6. The apparatus of claim 5, wherein the trigger portion has a first position corresponding to a first wire feed speed and at least a second position which corresponds to a second wire feed speed.

7. The apparatus of claim 5, wherein the trigger portion controls the wire feeding operation based on the movement of the trigger portion, wherein there is a non-linear relationship between the movement of the trigger portion and the wire feed speed of the wire.

8. The apparatus of claim 1, wherein the gun comprises at least one positionable connector portion, wherein the at least one positionable connector portion couples a first section of the gun to a second section of the gun and permits the first section to be positionable with respect to the second section.

9. The apparatus of claim 8, wherein the positionable connector allows the first section to rotate up to 360 degrees with respect to the second section.

10. The apparatus of claim 1, wherein the trigger portion activates the feeding of the wire and controls a speed of the feeding of the wire.

11. The apparatus of claim 2, wherein the at least one operational parameter includes a parameter to control feeding the wire through the wire feeding apparatus.

12. The apparatus of claim 11, wherein the at least one parameter is one of wire feed speed, a length of wire, a wire feed duration, and a wire feed pause time.

13. The apparatus of claim 3, wherein the user input device includes a display panel to display operational data.

14. The apparatus of claim 13, wherein the display panel is an LCD panel.

15. The apparatus of claim 13, wherein the operational data includes wire feed speed, wire diameter, or remaining wire.

16. The apparatus of claim 3, wherein the recording of the at least one parameter to the memory space is done during a wire deposition operation.

17. The apparatus of claim 8, wherein the gun comprises a second positionable connector portion, wherein the second positionable connector portion couples the section of the gun to a third section of the gun and permits the third section to be positionable with respect to the second section.

18. The apparatus of claim 17, wherein the second section includes the trigger portion the third section includes a nozzle.

19. The apparatus of claim 1, wherein the gun includes a nozzle and a flexible portion that couples the nozzle to a reminder of the gun, and
    wherein the flexible portion allows positioning of the nozzle relative to the remainder of the gun.

20. The apparatus of claim 1, wherein the trigger portion is a multi-position switch having at least an on position and an off position.

* * * * *